United States Patent [19]
Broquin et al.

[11] Patent Number: 5,867,623
[45] Date of Patent: Feb. 2, 1999

[54] INTEGRATED OPTIC DEVICE WITH ACTIVE AND PASSIVE GUIDE ZONES

[75] Inventors: Jean-Emmanuel Broquin, Grenoble; Roger Rimet, Saint Martin D'Heres, both of France

[73] Assignee: Schneider Electric SA, France

[21] Appl. No.: 884,138

[22] Filed: Jun. 27, 1997

[30] Foreign Application Priority Data

Jul. 24, 1996 [FR] France .................................. 9609536

[51] Int. Cl.⁶ ........................................... G02B 6/10
[52] U.S. Cl. ........................... 385/132; 385/131; 359/343
[58] Field of Search ................... 359/341, 342, 359/343, 344; 385/129, 130, 131, 132

[56] References Cited

U.S. PATENT DOCUMENTS 5,381,262  1/1995  Arima et al. .............................. 359/341
5,515,464  5/1996  Sheem ..................................... 385/132
5,623,568  4/1997  Khan et al. ............................... 385/131

FOREIGN PATENT DOCUMENTS 0 415 167    3/1991   European Pat. Off. .
2 381 328    9/1978   France .
WO 95/13553  5/1995   WIPO .

Primary Examiner—Hung N. Ngo
Attorney, Agent, or Firm—Parkhurst & Wendel

[57] ABSTRACT

The device integrates on the same glass substrate a passive monomode guide achieved by ion exchange in the substrate and an active monomode guide with lateral confinement by the substrate formed by an active thin layer deposited on the substrate and covering a zone in the form of a channel achieved by ion exchange in the substrate. The passive monomode guide constitutes the extension of the zone in the form of a channel of the active guide. The thin layer comprises a transition zone enabling adiabatic passage of the light from the passive guide to the active guide and vice-versa. The transition zone can be formed by an edge of the layer cutting the axis of the zone in the form of a channel obliquely or by a zone of variable thickness of the thin layer.

9 Claims, 3 Drawing Sheets

INTEGRATED OPTIC DEVICE WITH ACTIVE AND PASSIVE GUIDE ZONES

BACKGROUND OF THE INVENTION

The invention relates to an integrated optic device comprising a glass substrate, a flat, active, thin, guiding layer deposited on a surface of the substrate, and a zone in the form of a channel achieved in the substrate by ion exchange and comprising a first section, of predetermined cross section, flush with said surface and covered by the thin layer in such a way as to laterally bound a confinement zone of a light wave in the thin layer to form a monomode guide with lateral confinement by the substrate.

A known active optic device achieved in integrated optics comprises a polymer film deposited on a glass substrate and forming a guiding layer for the light. A non-guiding channel, formed by ion exchange in the substrate underneath the polymer film, defines a lateral confinement of the light waves in the part of the thin layer covering the channel. It has been proposed to use this type of optic device for optic switches (Article by N. E. SCHLOTTER et al.: "Fabrication of Channel waveguides in polydiacetylenes: composite diffused glass/polymer structures", Appl. Phys. Lett. 56(1), (Jan. 1, 1990).

SUMMARY OF THE INVENTION

The object of the invention is to achieve an optic device enabling active optic components such as modulators, amplifiers, sensors, switches or lasers to be fabricated at low cost.

According to the invention, this object is achieved by the fact that, the thin layer partially covering said surface of the substrate, the first section is extended in the substrate by at least a second section, not covered by the thin layer, in the form of a channel, formed by ion exchange and of a predetermined cross section larger than the cross section of the first section so as to form a passive monomode guide in the substrate.

Integrating on a single substrate passive guide zones achieved by ion exchange and active guide zones using guiding by the evanescent wave and achieved by combining the ion exchange and layer deposition techniques enables an active optic device to be obtained which is both high-performance and inexpensive.

To improve the performances of such a device, it is recommendable to optimize the passage of the light waves from the passive guiding zones to the active guiding zones and vice-versa.

According to a development of the invention, this is achieved by the fact that the thin layer comprises a transition zone enabling the adiabatic passage of the light between the second section and the thin layer.

According to an alternative embodiment, the transition zone comprises at least one edge of the thin layer cutting the zone in the form of a channel obliquely at a predetermined small angle in such a way as to bound in the zone in the form of a channel at least a totally covered axial portion, a totally uncovered axial portion and a partially covered axial portion.

The totally covered axial portion is preferably formed by the first section, the totally uncovered axial portion by the second section and the partially covered axial portion by an intermediate section of variable cross section comprised between the cross sections of the first and second sections.

According to a second alternative embodiment, the transition zone is formed by at least one zone of variable thickness of the thin layer, said thickness increasing from the second section to the first section. The zone of variable thickness of the layer forms a very small angle with the surface of the substrate.

BRIEF DESCRIPTION OF THE DRAWINGS

Other advantages and features will become more clearly apparent from the following description of particular embodiments of the invention given as non-restrictive examples only and represented in the accompanying drawings in which.

DETAILED DESCRIPTION OF THE PREFERRED EMBODIMENT

Figure 1:
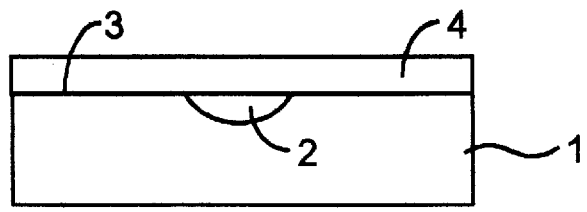
FIG. 1 illustrates an active guiding device according to the prior art.

The monomode guide with confinement by the substrate of FIG. 1 comprises a glass substrate 1 in which a zone 2 in the form of a channel is achieved by ion exchange. The zone 2 is flush with the surface 3 (upper face of FIG. 1) of the substrate 1. A thin, flat, guiding layer 4 is deposited on the surface 3. In a device of this kind, the light waves are guided in the layer 4. The zone 2 in the form of a channel in contact with the evanescent part of the light waves causes a lateral confinement of the light in the layer 4 near to the zone 2. Horizontal guiding of the light waves is thus achieved.

Figure 2:
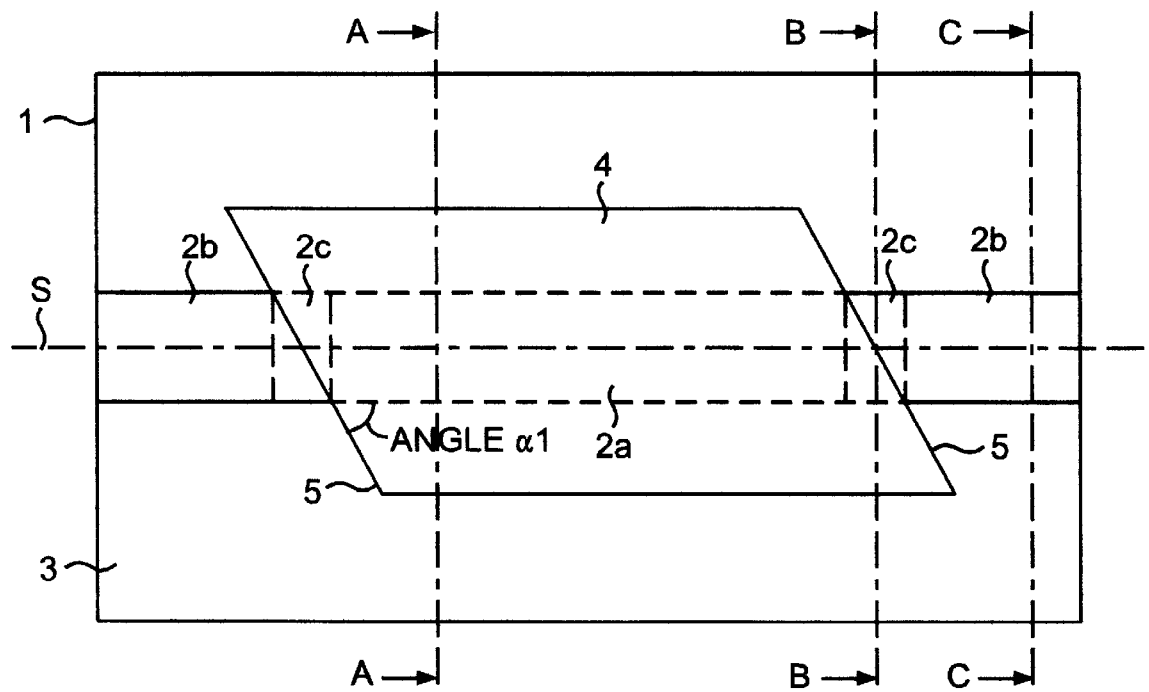
FIG. 2 represents, seen from above, a first embodiment of a device according to the invention.

The device according to FIGS. 2 and 4 to 6 combines on a single glass substrate 1 the techniques of passive guiding and of lateral guiding by the evanescent wave. The thin layer 4 covers a part of the surface 3 of the glass substrate only. The zone 2, in the form of a channel, achieved by ion exchange in the substrate, comprises a first section 2a covered by the thin layer 4. This part of the device forms a guide with confinement by the substrate of the same type as in FIG. 1. The first section 2a is extended in the substrate by second sections 2b not covered by the thin layer 4. In FIG. 2, the second sections 2b extend the section 2a at both its ends. The sections 2b achieved by ion exchange form a passive guide in the substrate.

Figure 4:
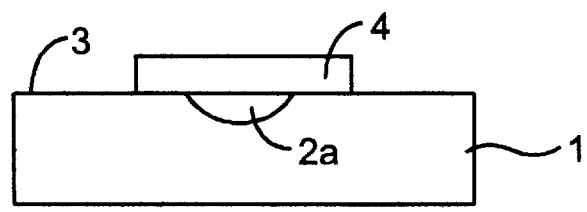
Figure 6:
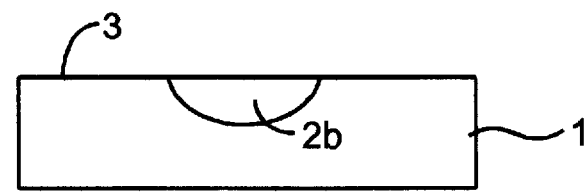

In the embodiment of FIGS. 4 and 6, the first and second sections 2a and 2b are flush with the surface 3 of the substrate. They are distinguished by their cross section. The cross section of the first section 2a is smaller than the cross section of the second section 2b, these cross sections being such that, for a predetermined wavelength, the first section is non guiding whereas the second section is guiding.

To enable the light wave to pass with a minimum of losses from the passive monomode guide situated in the substrate, formed by the section 2b, to the monomode guide with confinement by the substrate, formed by the thin layer 4 and section 2a, and vice-versa, the thin layer 4 comprises transition zones.

Figure 5:
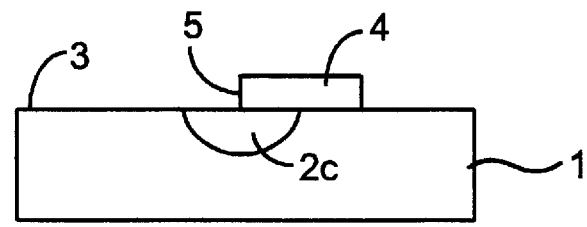

In the embodiment of FIGS. 2 and 5, a transition zone of the layer 4 is formed by an edge 5 of the layer which cuts the zone 2 in the form of a channel obliquely at a predetermined angle α1. The angle α1, highly exaggerated in FIG. 2 for the sake of clarity, is very small, preferably less than about one degree. The edge 5 thus bounds in the zone 2 in the form of a channel a totally covered axial portion formed by the first section 2a, a totally uncovered axial portion formed by the second section 2b, and a partially covered axial portion formed by an intermediate section 2c arranged between the first and second sections. As represented in FIG. 5, the cross section of the variable intermediate section is comprised between the cross sections of the first (2a) and second (2b) sections.

As a non-restrictive example, the thin layer 4 may have a thickness smaller than 10 micrometers, preferably smaller than 3 micrometers. It is typically about 1 micrometer, and the angle α1 is smaller than 1°, preferably about 0.5°.

In FIG. 2, the thin layer 4 has appreciably the form of a parallelogram having two sides parallel to an axis S of the zone 2 in the form of a channel and two sides 5 making an angle α1 with the axis S and each forming a transition zone between a section 2b and a section 2a.

Figure 3:
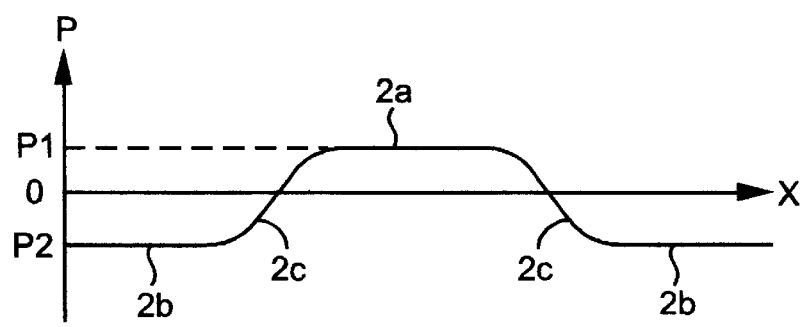
FIG. 3 illustrates the variations of the depth of the propagation axis of the light with respect to the top face of the substrate of the device according to FIG. 2, FIGS. 4 to 6 respectively represent cross sections along A—A, B—B and C—C of the device according to FIG. 2, FIGS. 7 and 8 represent a second embodiment of a device according to the invention, respectively in front view and in top view.

With the device of FIGS. 2, and 4 to 6, the variations of the depth P of propagation of a light wave according to its position x along the axis S are as represented in FIG. 3. The zero depth corresponding to the surface 3 of the substrate 1, the light wave propagates to a negative depth P2 in the sections 2b and to a positive depth P1 in the part of the layer 4 covering the section 2a. The width of the transition zone between the depths P1 and P2 depends on the angle α1 and on the width of the channel 2.

Passage of the light therefore takes place in adiabatic manner from the passive monomode guide situated in the substrate to the monomode guide with confinement by the substrate, and vice-versa.

Figure 7:
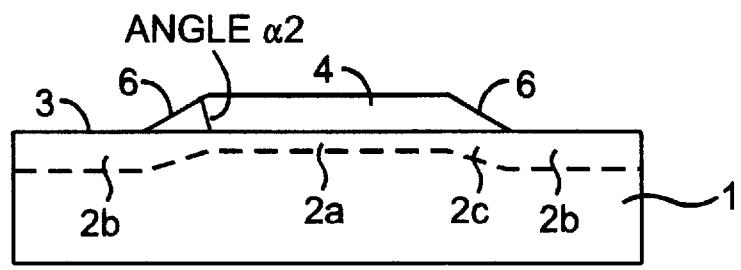
Figure 8:
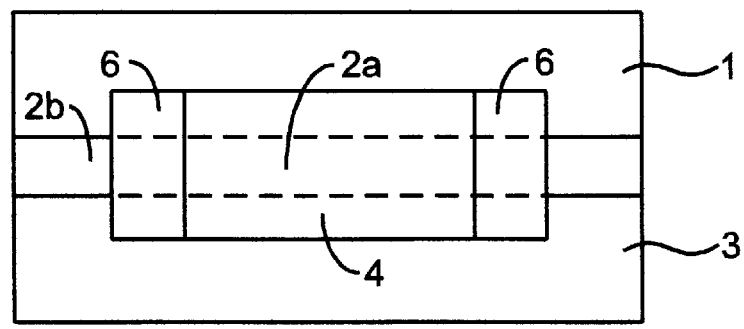

FIGS. 7 and 8 represent a second embodiment of the transition zone of the thin layer 4. The thin layer 4 has a predetermined thickness, appreciably constant above the first section 2a, and a variable thickness, increasing from the non-covered second section 2b to the covered first section 2a. The part 6 of variable thickness of the layer 4 forms with the surface 3 of the substrate 1 a very small angle α2. In practice, the angle α2 is of the same order of magnitude as the angle α1 previously described.

Figure 9:
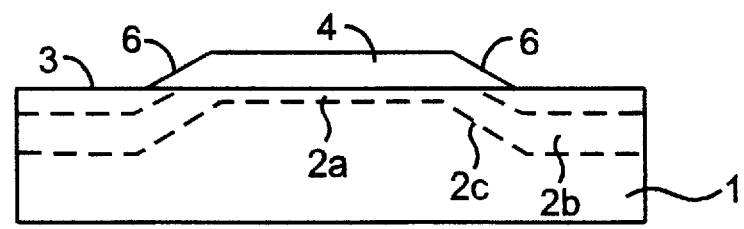
FIG. 9 represents, in front view, an alternative embodiment of the device according to FIG. 7.

In the embodiment of FIG. 9, the sections 2b are not flush with the surface 3 of the substrate but are buried more deeply in the substrate, which notably makes coupling of the device with other optic elements such as optic fibers easier. A technique particularly suited to formation of the channel 2 with sections of variable depth is described in document WO-A-9513553.

The thin layer 4 can be made from any material which interacts with light to enable a light wave, according to the case, to be amplified, modulated, absorbed, switched or picked up. As an example, oxides, glasses, or polymers can be used. The thin layer can be deposited by any suitable process, in particular by a sol-gel process, or by cathodic sputtering. The layer can be doped with rare earths;

The adiabatic condition is determined by the angle (α1 or α2) of attack of the active thin layer and by the difference between the propagation constants of the light in the passive zone on the one hand and the active zone on the other hand.

We claim:

1. An integrated optic device comprising a glass substrate, a flat, active, thin, guiding layer deposited on a surface of the substrate, and a zone in the form of a channel achieved in the substrate by ion exchange and comprising a first section, of predetermined cross section, flush with said surface and covered by the thin layer in such a way as to laterally bound a confinement zone of a light wave in the thin layer to form a monomode guide with lateral confinement by the substrate, a device wherein, the thin layer partially covering said surface of the substrate, the first section is extended in the substrate by at least a second section, not covered by the thin layer, in the form of a channel, formed by ion exchange and of a predetermined cross section larger than the cross section of the first section so as to form a passive monomode guide in the substrate.

2. The device according to claim 1, wherein the thin layer comprises a transition zone enabling the adiabatic passage of the light between the second section and the thin layer.

3. The device according to claim 2, wherein the transition zone comprises at least one edge of the thin layer cutting the zone in the form of a channel obliquely at a pre-determined small angle in such a way as to bound in the zone in the form of a channel at least a totally covered axial portion, a totally uncovered axial portion and a partially covered axial portion.

4. The device according to claim 3, wherein the totally covered axial portion is formed by the first section, the totally uncovered axial portion by the second section and the partially covered axial portion by an intermediate section of variable cross section comprised between the cross sections of the first and second sections.

5. The device according to claim 2, wherein the transition zone is formed by at least one zone of variable thickness of the thin layer, said thickness increasing from the second section to the first section.

6. The device according to claim 5, wherein the zone of variable thickness of the layer forms a very small angle with the surface of the substrate.

7. The device according to claim 3, wherein the angle is smaller than about 1°.

8. The device according to claim 1, wherein the thin layer is formed by an oxide, a glass or a polymer.

9. The device according to claim 8, wherein the thin layer is doped with rare earths.

* * * * *